United States Patent
Rupp et al.

(10) Patent No.: US 8,374,552 B2
(45) Date of Patent: Feb. 12, 2013

(54) CONCURRENT TESTING OF MULTIPLE COMMUNICATION DEVICES

(75) Inventors: Craig E. Rupp, Ames, IA (US); Richard Henry Mace Keene, Newport (GB)

(73) Assignee: National Instruments Corporation, Austin, TX (US)

( * ) Notice: Subject to any disclaimer, the term of this patent is extended or adjusted under 35 U.S.C. 154(b) by 676 days.

(21) Appl. No.: 12/564,189

(22) Filed: Sep. 22, 2009

(65) Prior Publication Data

US 2010/0077270 A1  Mar. 25, 2010

Related U.S. Application Data (60) Provisional application No. 61/099,106, filed on Sep. 22, 2008, provisional application No. 61/098,932, filed on Sep. 22, 2008, provisional application No. 61/105,551, filed on Oct. 15, 2008.

(51) Int. Cl.
*H04B 1/00* (2006.01)

(52) U.S. Cl. .......... 455/63.1; 455/67.11; 455/67.14; 455/70; 455/67.54; 455/317; 455/316; 455/67.3; 455/67.4; 375/347; 375/224; 375/221; 375/223

(58) Field of Classification Search .......... 455/67.11, 455/67.14, 70, 67.5, 317, 316, 67.3, 67.4; 375/347, 224, 221, 223
See application file for complete search history.

(56) References Cited

U.S. PATENT DOCUMENTS

| | | | |
|---|---|---|---|
| 6,028,439 A * | 2/2000 | Arkin et al. | 324/762.02 |
| 7,340,219 B2 | 3/2008 | Heaton et al. | |
| 2004/0177303 A1* | 9/2004 | Miura | 714/741 |
| 2005/0114550 A1* | 5/2005 | Kushnick | 709/248 |
| 2005/0176376 A1 | 8/2005 | Liu | |
| 2005/0240852 A1* | 10/2005 | Inaba et al. | 714/740 |
| 2006/0003704 A1* | 1/2006 | Jin | 455/70 |
| 2006/0215744 A1* | 9/2006 | O'Neill | 375/224 |
| 2007/0275667 A1 | 11/2007 | Leung et al. | |

OTHER PUBLICATIONS

International Search Report and Written Opinion for Application No. PCT/US2009/057829, mailed Mar. 1, 2010; 14 pages.
Larry Zhang, Dale Heaton, and Hank Largey; "Low Cost Multisite Testing of Quadruple Band GSM Transceivers"; Texas Instruments, Inc.; International Test Conference; 2005; 8 pages.

* cited by examiner

*Primary Examiner* — Matthew Anderson
*Assistant Examiner* — Ganiyu A Hanidu
(74) *Attorney, Agent, or Firm* — Meyertons Hood Kivlin Kowert & Goetzel, P.C.; Jeffrey C. Hood; Joel L. Stevens (57) ABSTRACT

Testing a plurality of communication devices. A plurality of signals may be received from the plurality of communication devices. The plurality of signals may include a signal from each of the plurality of communication devices, where a first subset of the plurality of signals has a different frequency than a second subset of the plurality of signals. The received signals may be combined into a combined signal. The combined signal may be downconverted to a combined signal, e.g., by mixing the combined signal with an output from at least one local oscillator. The downconverting may generate a plurality of lower frequency signals, each corresponding to one of the plurality of received signals. Testing may be performed on each of the plurality of lower frequency signals.

20 Claims, 10 Drawing Sheets

CONCURRENT TESTING OF MULTIPLE COMMUNICATION DEVICES

PRIORITY INFORMATION

This application claims benefit of priority of U.S. provisional application Ser. No. 61/099,106 titled "Concurrent Testing of Multiple Communication Devices" filed Sep. 22, 2008, whose inventors are Craig E. Rupp and Richard Henry Mace Keene, which is hereby incorporated by reference in its entirety as though fully and completely set forth herein.

This application claims benefit of priority of U.S. provisional application Ser. No. 61/098,932 titled "GSM Single Burst Calibration Method" filed Sep. 22, 2008, whose inventors are Craig E. Rupp and Richard Henry Mace Keene, which is hereby incorporated by reference in its entirety as though fully and completely set forth herein.

This application also claims benefit of priority of U.S. provisional application Ser. No. 61/105,551 titled "Concurrent Testing of Multiple Communication Devices" filed Oct. 15, 2008, whose inventors are Craig E. Rupp and Richard Henry Mace Keene, which is hereby incorporated by reference in its entirety as though fully and completely set forth herein.

FIELD OF THE INVENTION

The present invention relates to the field of test and measurement, and more particularly to concurrent testing of multiple communication devices.

DESCRIPTION OF THE RELATED ART

In recent years, with the mass production of devices, especially cellular phones, rapid testing has become increasingly important. Even very small gains in individual device tests can result in large decreases of testing times for mass quantities of devices as well as large monetary gains.

Figure 1:
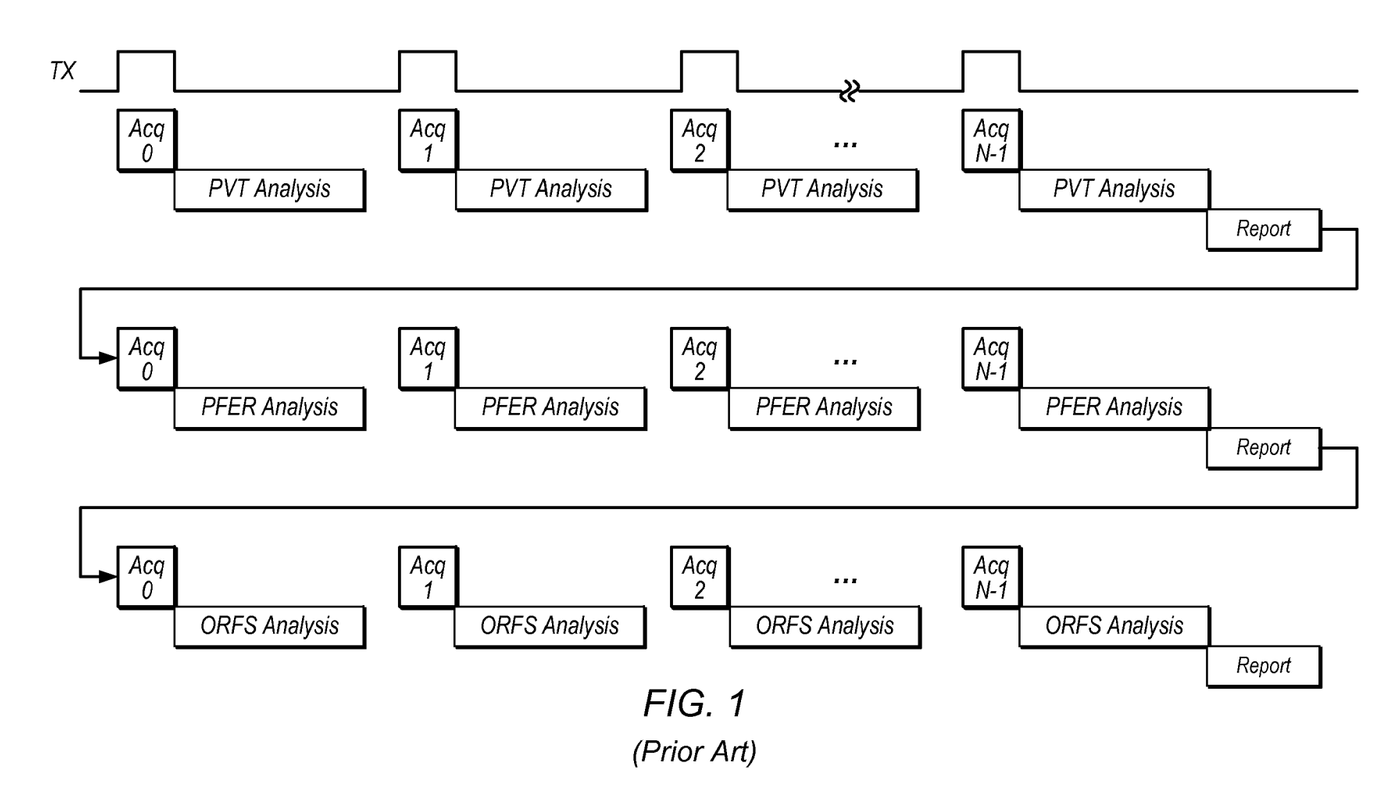
FIG. 1 provides an exemplary conventional approach for testing units under test.

Conventional boxed instruments typically perform key radio measurements sequentially, as shown in FIG. 1. In the test of FIG. 1, a GSM communication device is tested over N averages for a power versus time (PVT), phase and frequency error (PFER), and output RF spectrum (ORFS). Thus, typical systems perform sequential tests for each device. Accordingly, improvements in device testing are desired.

SUMMARY OF THE INVENTION

Various embodiments are presented of a system and method for performing concurrent testing of multiple communication devices.

A plurality of signals may be received from a plurality of communication devices (e.g., 2, 4, 8, 16, etc. communication devices). The plurality of signals may include a signal from each of the plurality of communication devices. The signals may be of different frequencies or frequency bands. For example, a first subset of the plurality of signals may have a different frequency than a second subset of the plurality of signals. In one embodiment, four different frequency bands may be present in the plurality of signals.

The received signals may be combined into a combined signal. The combined signal may be downconverted or otherwise mixed to a combined signal (e.g., a baseband signal). More specifically, the method may mix the combined signal with an output from at least one local oscillator (e.g., two local oscillators) to generate a plurality of lower frequency signals (e.g., baseband signals), each corresponding to one of the received signals.

Testing may be performed on each of the plurality of lower frequency signals. In some embodiments, the testing may be performed (or may otherwise include) executing a graphical data flow program to test each of the plurality of lower frequency signals, wherein the graphical data flow program implements pipelining and parallelism to provide improved testing of each of the plurality of lower frequency signals.

The method may include repeating the receiving, combining, downconverting and performing a plurality of times for different frequency bands, e.g., for each device. For example, each device may be tested for each different frequency band (e.g., for a total of four repetitions, where there are four frequency bands to be tested). During this iterative process, the local oscillator(s) may not be re-tuned for any of the plurality of signals.

Embodiments of the invention may be used to provide for concurrent testing of multiple communication devices, such as multiple wireless communication devices, e.g., cell phones.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. provisional application Ser. No. 61/099,106 titled "Concurrent Testing of Multiple Communication Devices" filed Sep. 22, 2008, whose inventors are Craig E. Rupp and Richard Henry Mace Keene.

U.S. provisional application Ser. No. 61/096,473 titled "GSM Single Burst Calibration Method" filed Sep. 22, 2008, whose inventors are Craig E. Rupp and Richard Henry Mace Keene.

U.S. provisional application Ser. No. 61/105,551 titled "Concurrent Testing of Multiple Communication Devices" filed Oct. 15, 2008, whose inventors are Craig E. Rupp and Richard Henry Mace Keene.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,219,628 titled "System and Method for Configuring an Instrument to Perform Measurement Functions Utilizing Conversion of Graphical Programs into Hardware Implementations," filed Aug. 18, 1997.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, flash memory, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed.

Graphical Data Flow Program (or Graphical Data Flow Diagram) —A graphical program or diagram comprising a plurality of interconnected nodes (blocks), wherein at least a subset of the connections among the nodes visually indicate that data produced by one node is used by another node. A LabVIEW® VI is one example of a graphical data flow program. A Simulink block diagram is another example of a graphical data flow program.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Real Time Application—may refer to software program(s) that are subject to real time constraints, e.g. operational deadlines from event to system response. For example, the real time application may execute a real time loop that iterates, e.g., once every 1 millisecond. Within each iteration of the loop, the code typically executes to read input data sources (events), perform calculations on those inputs, and write the resulting output data (system response). Since the loop executes under tight timing constraints, it is desirable to read the input data sources as quickly as possible.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Figure 2A:
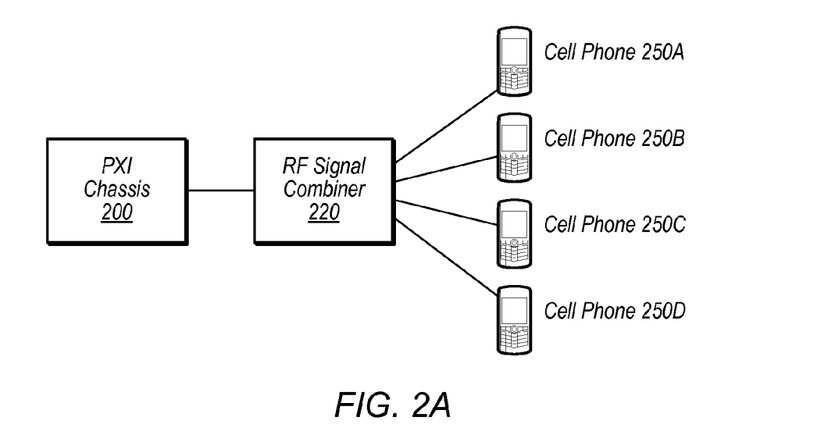
FIGS. 2A-2C are exemplary systems for carrying out various embodiments described herein.
Figure 2B:
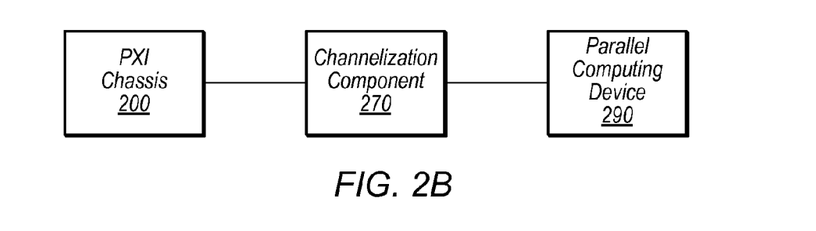
Figure 2C:
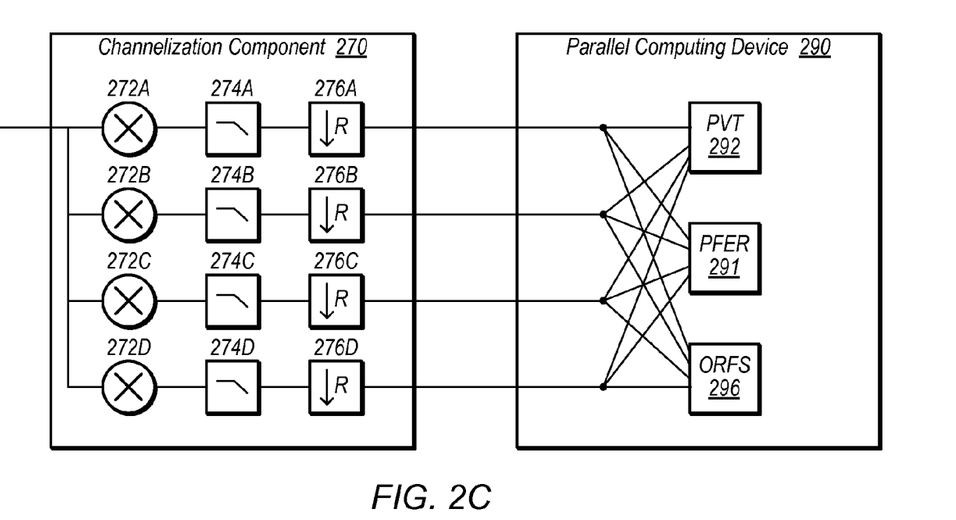

FIGS. 2A-2C—Exemplary Testing System

As shown in FIG. 2A, a PXI chassis 200, e.g., one provided by National Instruments Corporation, e.g., including a PXI- 5663 signal analyzer, may be coupled to a signal combiner 220. However, other types of signal analyzers besides PXI-5663 200 are envisioned.

A plurality of devices, e.g., cell phones, 250A, 250B, 250C, and 250D may be coupled to the PXI signal analyzer 200, e.g., via the signal combiner 220. The plurality of devices (also referred to as devices under test (DUTs) or units under test (UUTs)), may be quad band cell phones. In one embodiment, each UUT may provide a signal corresponding to a particular band of the UUT. For example, the UUT 250A may provide a signal at 836.6 MHz, e.g., to test the GSM 850 band of the UUT 250A, the UUT 250B may provide a signal at 907.6 MHz, e.g., to test the GSM 900 (PGSM) band of the UUT 250B, the UUT 250C may provide a signal at 1741.6 MHz to test the DCS 1800 band of the UUT 250C, and the UUT 250D may provide a signal at 1880 MHz to test the PCS 1900 band of the UUT 250D, e.g., simultaneously. Thus, as used herein, the term "band" may refer to a frequency range, e.g., corresponding to a particular frequency. For example, the 900 band described above may cover the frequency range of 890.2-914.8 MHz, although other frequency ranges are contemplated.

Figure 3A:
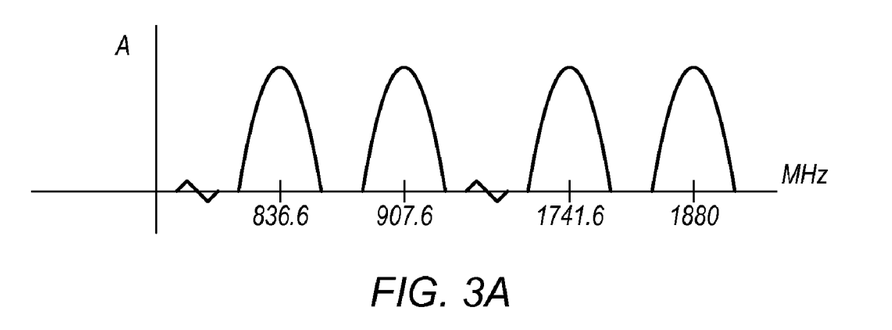
FIGS. 3A-3C are exemplary frequency graphs corresponding to various Figures, according to one embodiment.

Note that other numbers of UUTs are envisioned, such as 16 UUTs for simultaneous testing, as will be described in more detail below. Once these signals are combined in the signal combiner 220, the combined signal shown in FIG. 3A may be provided to PXI chassis 200 for down conversion. However, it should be noted that different signals may be provided by the UUTs other than those described above.

Figure 3B:
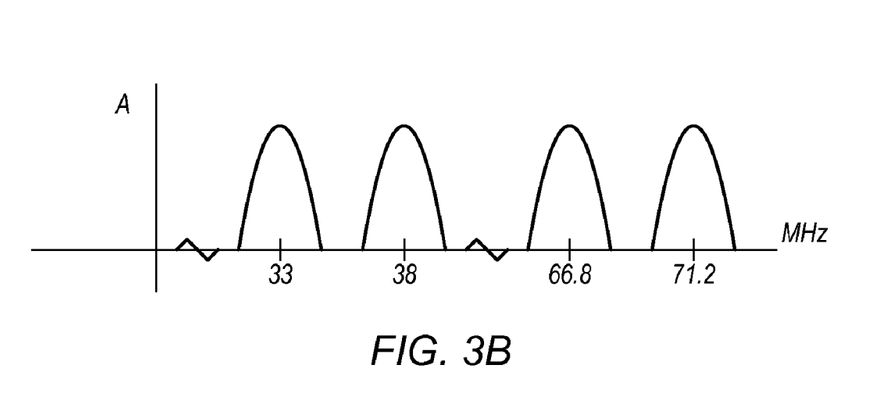

Note that in some embodiments, the signal combiner 220 may not be present, and the devices 250A-D may be coupled directly to the PXI chassis 200, although other configurations are envisioned. Thus, as shown in FIG. 2A, the outputs of the UUTs may be provided to the RF combiner 220, which may in turn provide a combined RF signal to the PXI chassis 200. The PXI chassis 200 may perform down conversion on the combined RF signal to reduce the signal to baseband or an intermediate frequency. FIG. 3B provides an exemplary combined, downconverted RF signal to an intermediate frequency. As shown in the graph of FIG. 3B (amplitude vs. MHz), the four signals have been combined and downconverted to 33 MHz (e.g., corresponding to the 1880 MHz signal), 38 MHz (e.g., corresponding to the 836.6 MHz signal), 66.8 MHz (e.g., corresponding to the 1741.6 MHz signal), and 71.2 MHz (e.g., corresponding to the 907.6 MHz signal), respectively. Note that other devices capable of downconversion may be used instead of the PXI chassis 200, as desired.

Once the combined RF signal is translated, the output of the PXI chassis 200 may be provided to a channelization component 270, as shown in FIG. 2B, which may execute a channelization algorithm on the down converted combined RF signal from PXI chassis 200. In the channelization algorithm (shown in FIG. 2C), the signal may be provided to four complex mixers, 272A-272D. Each complex mixer may receive signals from a respective channel and mix it down to baseband, e.g., 0 Hz, which is then filtered through a respective low pass filter 274A-274D. Thus, each of the signals of FIG. 3B may be isolated using the mixers 272 and the filters 274. Each of the filtered signals may then be decimated using decimators 276A-276D in order to reduce the data rate. However, it should be noted that the decimators 276A-276D may not be required in some embodiments.

Each channel output, e.g., after decimation, may be provided to parallel computing device 290. As shown, each of the signals may be provided to PVT (power versus time) test 292, PFER (phase and frequency error) test 294, and ORFS (output RF spectrum) test 296. PVT test 292 may include two measurements, PFER test 294 may include five measurements, and ORFS test 296 may include nine measurements. The parallel computing device may be able to perform all of these tests for each signal simultaneously and in parallel, e.g., by using the plurality of cores and/or processors present in the parallel computing device 290. In one embodiment, the combination of the signal, down conversion of the signal, channelization of the signal, and testing of the signal may be performed in real time, thereby increasing efficiency of the testing process for the UUTs 250A-D.

The parallel computing device 290 may be a computer system with a plurality of processor and/or cores, although other parallel computing devices are envisioned. In one embodiment, the tests may be performed by the computer system executing a graphical program, e.g., one created in LabVIEW® provided by National Instruments Corporation. In one embodiment, the measurements of each test (and possibly the tests themselves) may be performed in a parallel and pipelined manner, e.g., using one or more graphical programs. In one embodiment, the channelization component 270 and the parallel computing device 290 may be the same device, e.g., a computer system.

In some embodiments, one or more of the hardware devices used in the testing and signal processing may include programmable hardware elements, e.g., which are configured according to a graphical program. However, in alternate embodiments, the hardware devices may largely or completely implement a software solution which is executed by processors, e.g., a plurality of processors, e.g., with multiple cores.

Figure 4A:
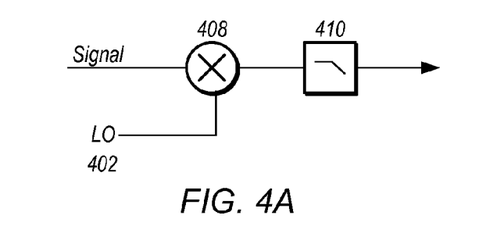
FIG. 4A is an exemplary single local oscillator embodiment.
Figure 4B:
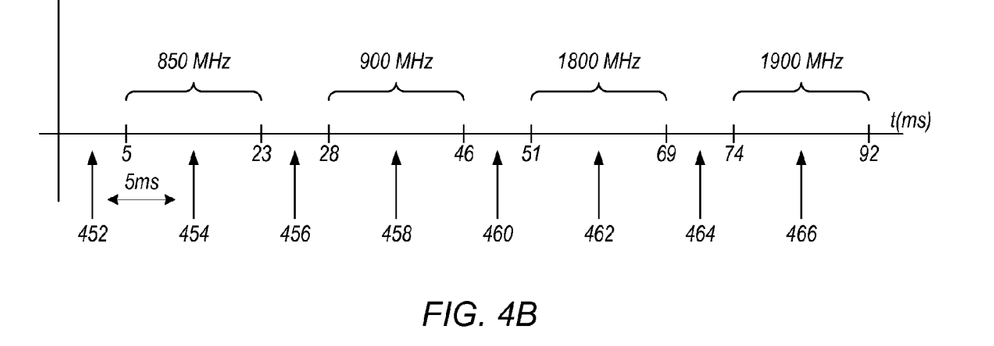
FIG. 4B is a timing diagram corresponding to FIG. 4A.

FIGS. 4A and 4B—UUT Quad Band Testing

FIG. 4A illustrates an exemplary single local oscillator (LO) signal pathway, and FIG. 4B illustrates a corresponding exemplary quad band testing timing diagram, according to conventional methods. As shown in FIG. 4A an input signal (e.g., an 1800 MHz signal for testing the DCS 1800 band) may be mixed with a LO 402 (e.g., tuned to 1600 MHz for the 1800 MHz signal) using mixer 408. The mixer 408 output may be 200 MHz and 3400 MHz (corresponding to the addition and difference of the two signals). Correspondingly, the 200 MHz signal may be filtered using filter 410, thus providing a single 200 MHz signal.

FIG. 4B illustrates an exemplary quad band testing timing diagram. As shown, in section 452, a 5 ms period is used to tune the LO 400 to the appropriate MHz (in this case, it may be 900 MHz, as an example) to test 850 MHz. During section 454, the 850 MHz band may be tested. For example, the phone may transmit 15 bursts at 850 MHz for provision to the mixer 402 of FIG. 4A. In section 456, the LO may be retuned to a new frequency, corresponding to the 900 MHz test. Similar to the previous test, 15 bursts may be transmitted at 900 MHz during section 458. In later sections 460 and 464 the LO may be retuned for the 1800 MHz and 1900 MHz bursts in sections 462 and 466 respectively. Thus, according to conventional methods, the single LO 400 may be used to mix down each band test to baseband, but requires retuning the LO 400 between each set of bursts.

Figure 5:
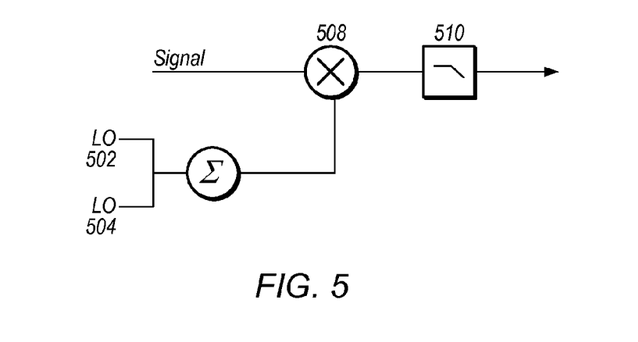
FIG. 5 is an exemplary double local oscillator embodiment.

FIG. 5—Multiple Local Oscillators for Quad Band Testing

As one way to address the lost periods between band testing of FIG. 4 above, a plurality of LOs may be used. For example, a first LO 502 and a second LO 504 may be added using summation 506. The summed LO signal may be provided to mixer 508 along with the input signal. Similar to the LO pathway of FIG. 4A, the output of the mixer 508 may be filtered by filter 510.

By mixing the combined LO signals and the signal with the mixer 508, retuning the LO in the conventional method of FIG. 4 may be avoided, thus resulting in a 20% gain in efficiency (based on removal of each 5 ms retuning time period 452, 456, 460, and 464) according to the exemplary timing diagram of FIG. 4B. In one embodiment, the multiple LOs may be included in the PXI chassis 200 (or other downconverter) from FIG. 2. Alternatively, two LOs (e.g., two PXI-5652 National Instruments signal generators) may be summed and provided to the PXI chassis 200.

The following provides an example of a multiple LO test that requires no retuning time portions. A UUT may be programmed to provide bursts at 836.6 MHz, 907.6 MHz, 1741.6 MHz, and 1885.0 MHz in sequential time periods (e.g., to test the 850, 900, 1800 and 1900 bands of the UUT), as shown in combined form in FIG. 3A. These may be offset from the exact middle band channel numbers in order to avoid interference of the resulting signals and/or to allow for a plurality of UUTs to be tested at the same time.

Figure 3C:
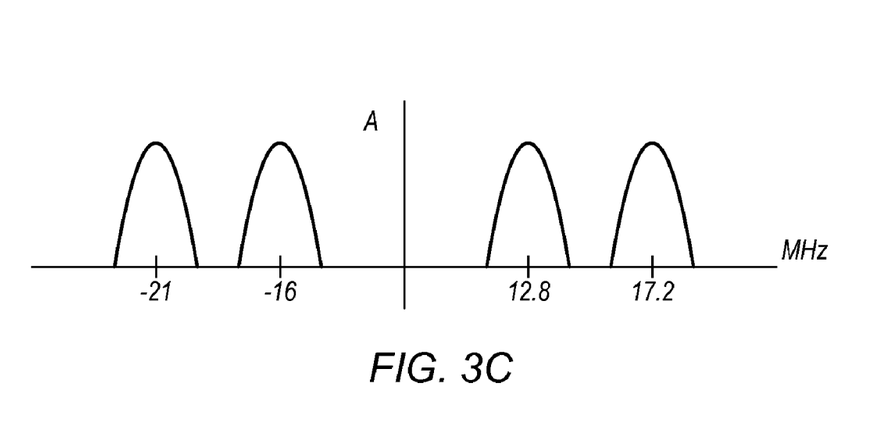

The two LOs (502 and 504) may be set at 869.6 and 1813.8 MHz respectively. When mixed, the 836.6 MHz signal may be converted to 33.0 MHz, the 907.6 MHz signal may be converted to 38.0 MHz, the 1741.6 MHz signal may be converted to 66.8 MHz, and the 1885.0 MHz signal may be converted to 71.2 MHz (shown in combined form in FIG. 3B). These resulting signals may be further mixed to −21.0 MHz, −16.0 MHz, 12 MHz, and 17.2 MHz respectively, as shown in combined form in FIG. 3C. Thus, two LOs may be used to provide a more efficient testing process.

Figure 6:
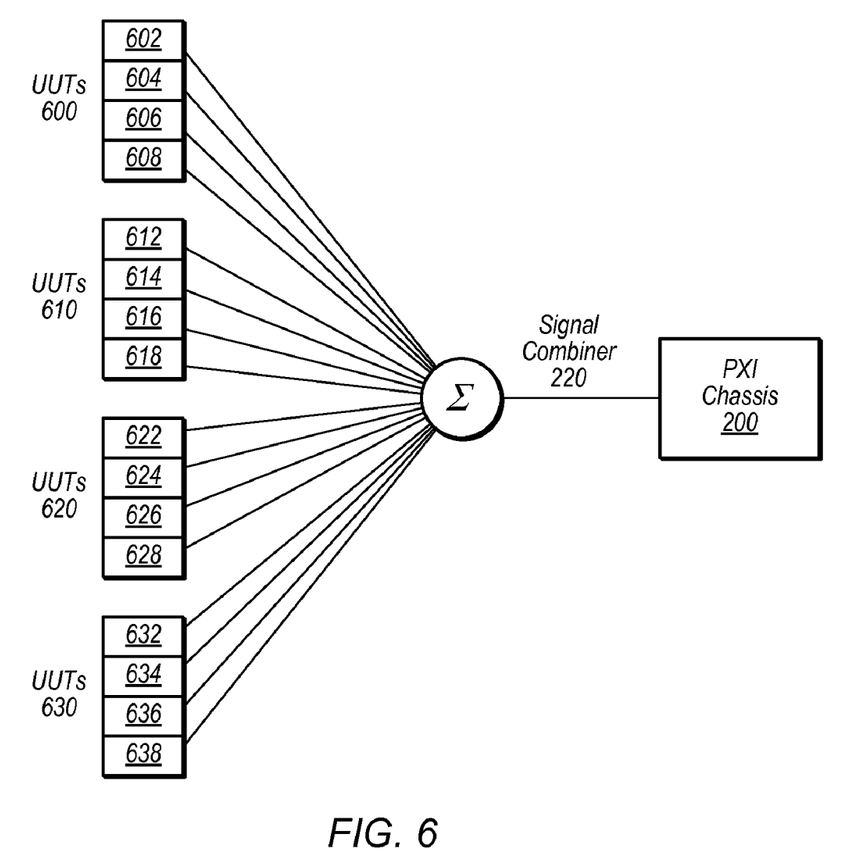
FIG. 6 is an exemplary system for testing 16 UUTs simultaneously.

FIG. 6—Using Multiple Local Oscillators to Test 16 UUTs Simultaneously

FIG. 6 illustrates an exemplary embodiment where 16 UUTs may be tested simultaneously, e.g., using the multiple LO embodiment described above, with respect to FIG. 5. As shown, four sets of four UUTs (each set of four sometimes referred to as a biscuit) may be tested simultaneously. More specifically, the first set of four UUTs 600 (UUTs 602, 604, 606, and 608), the second set of four UUTs 610 (UUTs 612, 614, 616, and 618), the third set of four UUTs 620 (UUTs 622, 624, 626, and 628), and the fourth set of four UUTs 630 (UUTs 632, 634, 636, and 638) may all be coupled to signal combiner 220, which may provide the combined output signal to PXI chassis 200.

In one embodiment, the first set of UUTs 600 may each output signals near the 850 MHz band (with each frequency offset slightly from each other so that the signals may be isolated at a later point, e.g., according to embodiments described above). Similarly, the second set of UUTs 610 may each output signals near the 900 MHz band, the third set of UUTs 620 may each output signals near the 1800 band, and the fourth set of UUTs 630 may each output signals near the 1900 band.

All of the UUTs may provide a first set of bursts for their respective bands at a first time period, and then may provide a second set of bursts for their next respective band during a second time period. This may be repeated until each set of UUTs has provided signals for all of the bands being tested. Thus, in one embodiment, after four time periods, every band of every UUT may be tested. As already noted, the use of two added LOs allows the retuning periods to be avoided. Thus, not only is the individual process made faster (by avoiding these retuning periods), but by offsetting each UUT in each set of UUTs from each other, 16 UUTs can be tested at the same time. In some embodiments, more than four UUTs may be provided in each set, thus allowing even more UUTs to be tested simultaneously.

Figure 7:
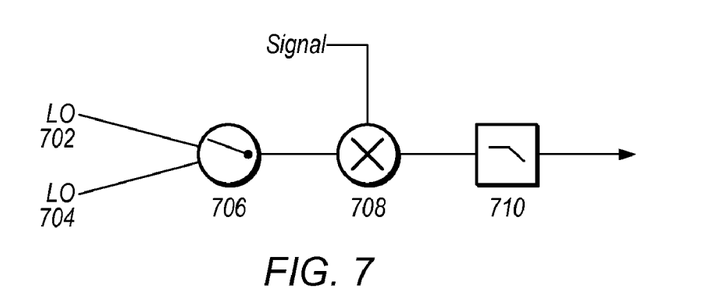
FIG. 7 is an exemplary double local oscillator embodiment.

FIG. 7—Ping Pong Local Oscillators Testing

FIG. 7 provides another method to avoid the retuning time periods discussed in FIG. 4. In this embodiment, two LOs may be used, but in an alternating manner. Thus, a first LO may be used to test a first band (e.g., the 850 MHz band) and the second LO may be retuned to the next band (e.g., the 900 MHz band) at the same time. After the first band is completed, the LOs may be switched for the next band test, thereby eliminating the 5 ms retuning time in the conventional method. In this time period, the first LO may retune for the third testing band while the output of the second LO is used for the test.

As shown in FIG. 7, LO 702 and LO 704 may be coupled to mixer 708 via switch 706. The switch may be used to alternate LOs, thereby allowing the LO not currently being used to retune for the next band test. Similar to the method of FIG. 5, the ping pong LO approach may provide a 20% gain in efficiency.

In some embodiments, the ping pong LO approach may be applied for the testing scenario of FIG. 6 described above.

Figure 8:
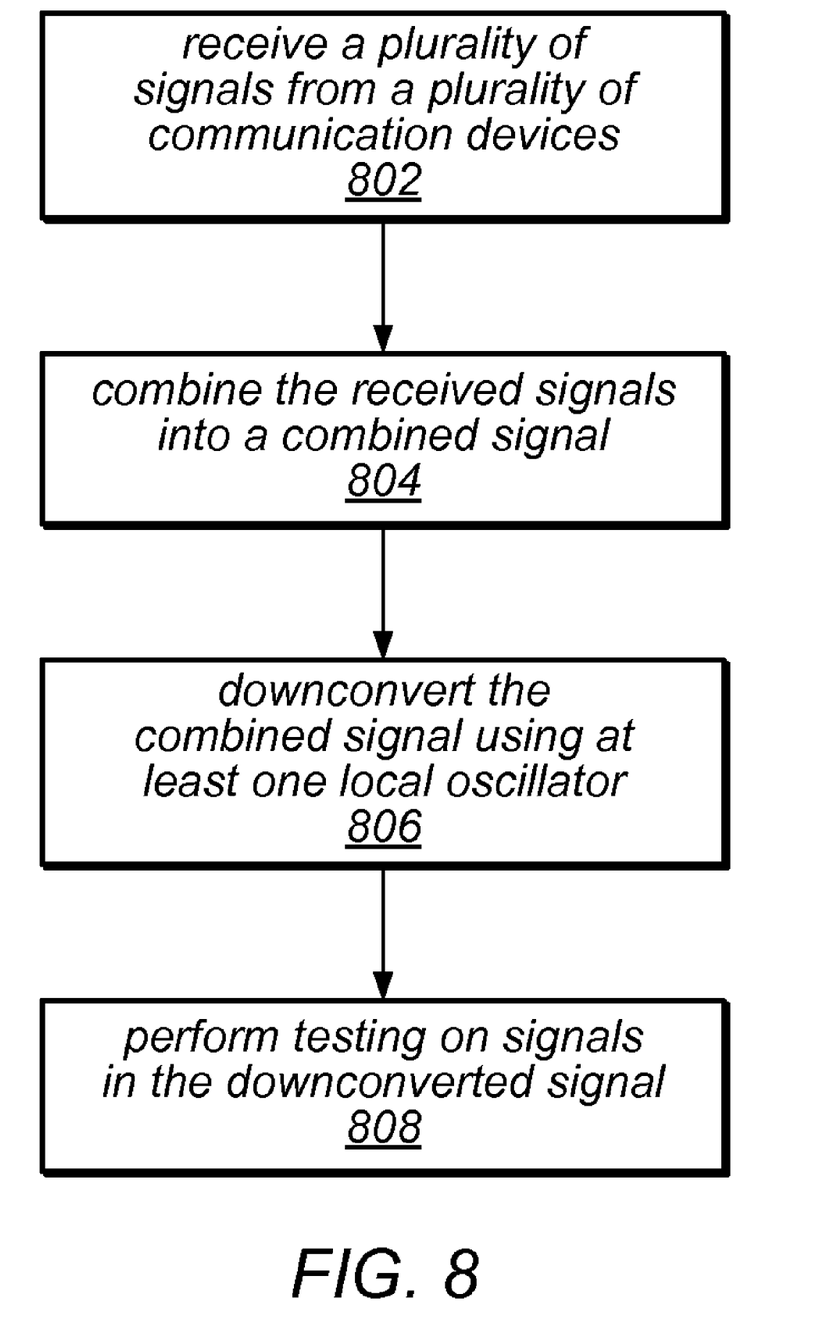
FIG. 8 is a flowchart diagram illustrating one exemplary method for simultaneously testing a plurality of communication devices, according to one embodiment.

FIG. 8—Method for Testing a Plurality of Communication Devices

FIG. 8 illustrates a method for testing a plurality of communication devices. The method shown in FIG. 8 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 802, a plurality of signals may be received from a plurality of communication devices (e.g., 2, 4, 8, 16, etc. communication devices). The plurality of signals may be received in a concurrent fashion, where all of the signals are received within a same acquisition time period. The plurality of signals may include a signal from each of the plurality of communication devices. As indicated above, the signals may be of different frequencies or frequency bands. For example, a first subset of the plurality of signals may have a different frequency than a second subset of the plurality of signals. In one particular embodiment, every signal may have a different frequency. In one embodiment, four different frequency bands may be present in the plurality of signals, e.g., with more than one signal corresponding to a particular frequency band. Thus, different subsets of the signals may correspond to different frequency bands. However, each signal may still be unique, even within a particular frequency band.

Figure 9:
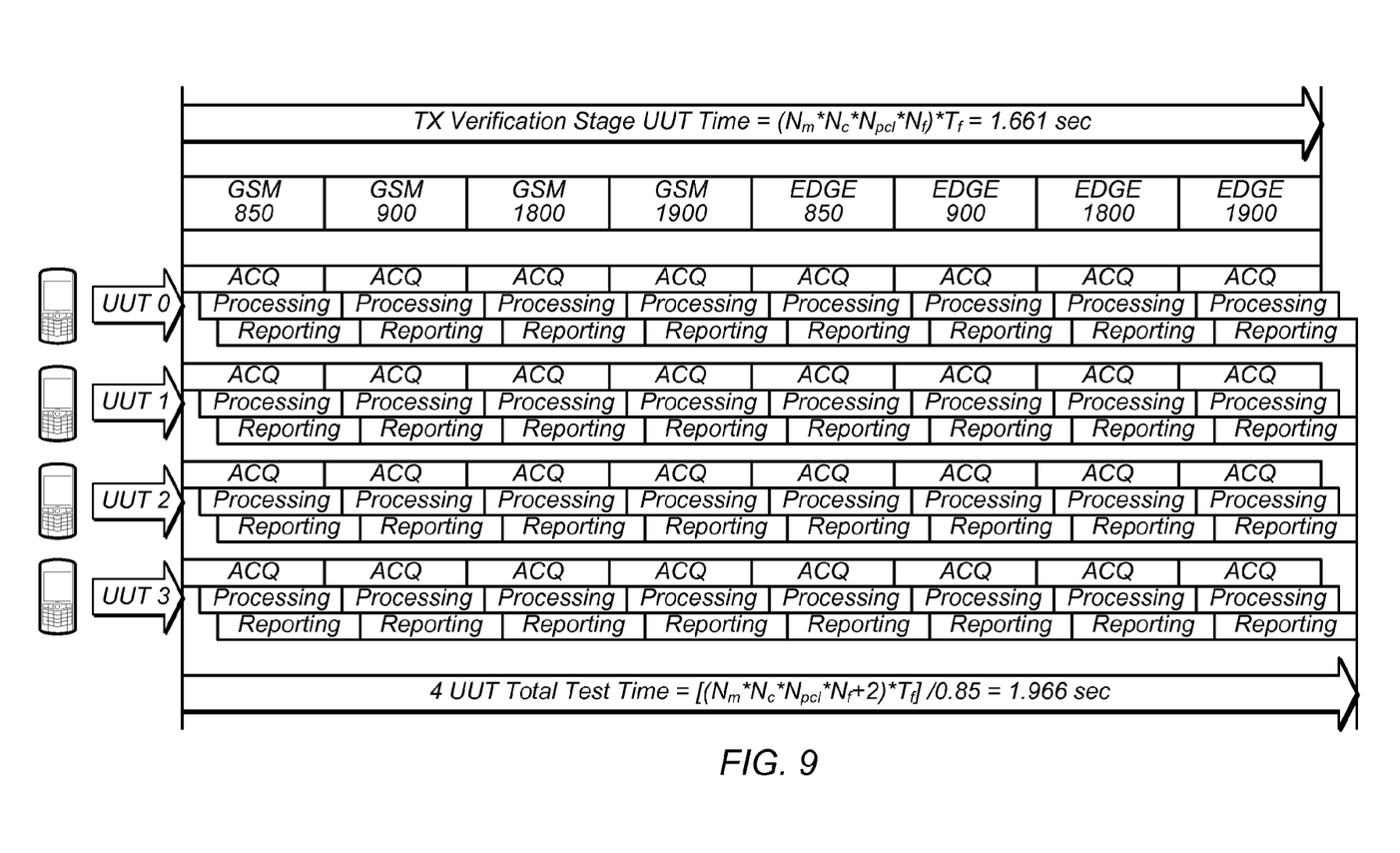
FIGS. 9 and 10 are exemplary diagrams illustrating timing of one embodiment for testing communication devices.

FIG. 9 illustrates an embodiment where four different UUTs are being tested (UUT 0, UUT 1, UUT 2, and UUT3). As shown in FIG. 9, in a first time period each phone may provide a signal corresponding to the GSM 850 band, in a second time period each phone may provide a signal corresponding to the GSM 900 band, in a third time period each phone may provide a signal corresponding to the GSM 1800 band, and in a fourth time period each phone may provide a signal corresponding to the GSM 1900 band. In this embodiment, EDGE testing may also be performed, including the EDGE 850 band, the EDGE 900 band, the EDGE 1800 band, and the EDGE 1900 band, in the 5-9 time periods, respectively. In each time period the signals may be received from each UUT as in 802, and the may be processed, e.g., as described in 804, 806, and 808 below. As also described herein, the results may also be provided within each time period, in a real-time manner, although other embodiments are envisioned.

In 804, the received signals may be combined into a combined signal, and in 806, the combined signal may be downconverted or otherwise mixed to a combined signal (e.g., a baseband signal). More specifically, the method may mix the combined signal with an output from at least one local oscillator (e.g., two local oscillators) to generate a plurality of lower frequency signals (e.g., baseband signals), each corresponding to one of the received signals. Any of the embodiments described above (e.g., regarding FIGS. 5-7) may be used for the combining and mixing of 804 and 806, as desired.

In 808, testing may be performed on each of the plurality of lower frequency signals. For example, as indicated above, each lower frequency signal may undergo a series of tests, such as a PVT test, PFER test, and ORFS test, among others. In some embodiments, the PVT test 292 may include two measurements, the PFER test 294 may include five measurements, and the ORFS test 296 may include nine measurements. A parallel computing device (such as a computer system or chassis, as described above) may be able to perform all of these tests for each signal simultaneously and in parallel (e.g., in a concurrent fashion), e.g., by using the plurality of cores and/or processors present in the parallel computing device 290. In one embodiment, the combination of the signal, down conversion of the signal, channelization of the signal, and testing of the signal may be performed in real time, thereby increasing efficiency of the testing process for the plurality of communication devices.

Figure 10:
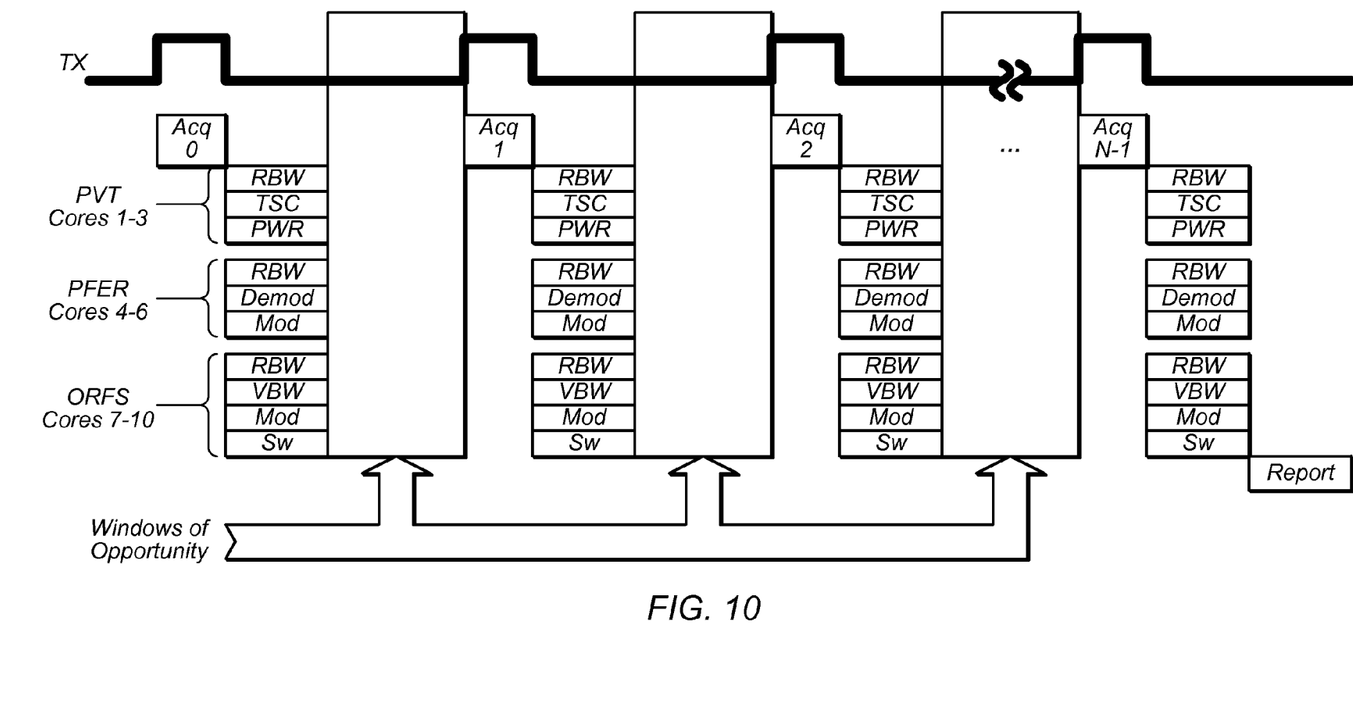

As indicated above, testing may be performed in a parallel and/or pipelined fashion. For example, as shown in the exemplary timing diagram of FIG. 10, signal(s) may be acquired during a first time slot (Acq 0) and testing may be performed after the acquisition but before the following acquisition (in this case Acq 1, up to Acq N−1). In this example, cores 1-3 may perform PVT (power versus time) testing, including RBW (resolution bandwidth filtering), TSC (training sequence detection), and PWR (power calculation); cores 4-6 may perform PFER (phase and frequency error) testing, including RBW, Demod (demodulation), and Mod (modulation); and cores 7-10 may perform ORFS (output RF spectrum) testing, including RBW, VBW (video bandwidth filtering), Mod (ORFS due to modulation), and Sw (ORFS due to switching). As shown in the timing diagram, there are windows of opportunity for further testing or processing after the testing but before the following acquisition. This allows for greater flexibility in the testing process, which is highly desirable going forward. Additionally, it may be possible to decrease the time period between acquisitions to allow for even faster testing of the plurality of communication devices.

Figure 11:
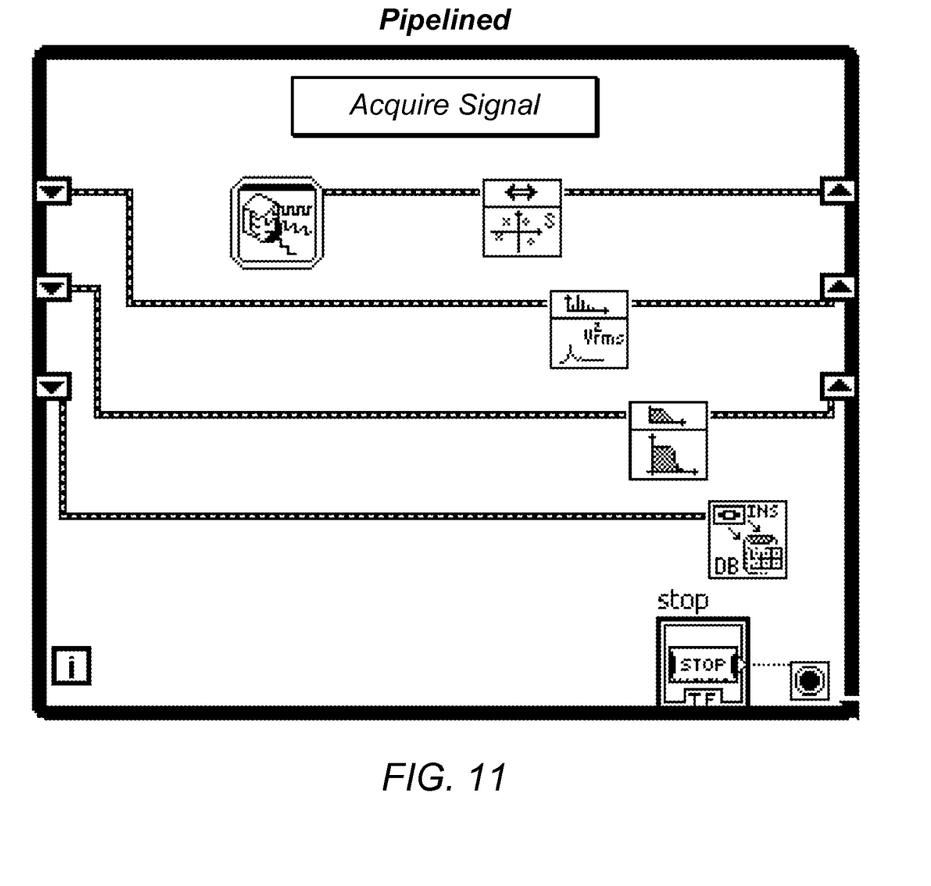
FIGS. 11 and 12 illustrate exemplary graphical program portions which may be used to perform testing on signals received from a plurality of communication devices, according to one embodiment.
Figure 12:
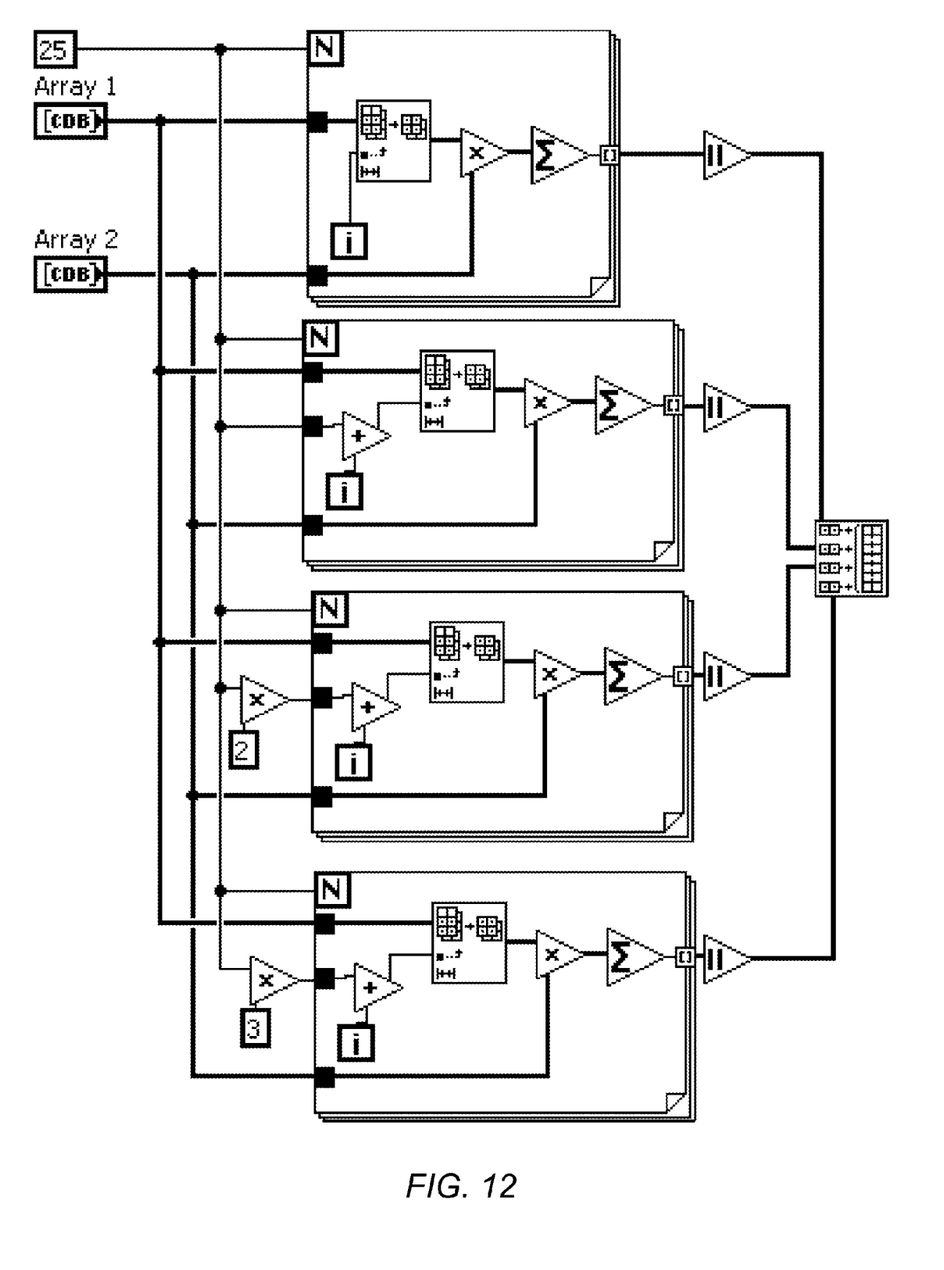

In some embodiments, as previously indicated, the testing may be performed (or may otherwise include) executing a graphical data flow program to test each of the plurality of lower frequency signals. For example, the graphical program may implement pipelining and parallelism to provide improved testing of each of the plurality of lower frequency signals. FIG. 11 provides an example of a graphical program portion that implements pipelined testing and FIG. 12 provides an example of a graphical program portion that implements parallel testing using a plurality of iteration structures. Thus, in some embodiments, the testing of signals may be performed by the execution of graphical programs (e.g., by a computer system or implemented by a programmable hardware element, such as an FPGA). Additionally, the graphical programs may implement parallelism and/or pipelining to achieve a more flexible and efficient process.

The method may include repeating the receiving (802), combining (804), downconverting (806), and performing (808) a plurality of times for different frequency bands, e.g., for each device. For example, each device may be tested for each different frequency band (e.g., for a total of four repetitions, where there are four frequency bands to be tested). During this iterative process, the at least one local oscillator may not be re-tuned for any of the plurality of signals, as indicated above.

The output of the testing may be stored in a memory medium or provided, e.g., for display, possibly over a network. The output of the testing may be provided on each iteration or after completion of testing for the communication devices. The method may be repeated for a plurality of sets of communication devices, e.g., in a communication device testing facility, as desired.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for testing a plurality of communication devices, the method comprising:
   receiving a plurality of signals from the plurality of communication devices, the plurality of signals comprising a respective signal from each of the plurality of communication devices, wherein each signal of a first subset of the plurality of signals has a different frequency than each signal of a second subset of the plurality of signals, wherein the plurality of signals are received concurrently;
   combining the received signals into a combined signal;
   downconverting the combined signal, wherein said downconverting comprises mixing the combined signal with an output from at least one local oscillator, wherein said downconverting generates a plurality of lower frequency signals, each of the plurality of lower frequency signals corresponding to a respective one of the plurality of received signals; and
   performing testing on each of the plurality of lower frequency signals, wherein said testing on each of the plurality of lower frequency signals is performed concurrently.

2. The method of claim 1, wherein the at least one local oscillator comprises two local oscillators.

3. The method of claim 1, wherein the lower frequency signals comprise baseband signals.

4. The method of claim 1, further comprising:
   repeating said receiving, said combining, said downconverting and said performing testing a plurality of times for different frequency bands;
   wherein the at least one local oscillator is not re-tuned for any of the plurality of signals.

5. The method of claim 1,
   wherein said performing testing on each of the plurality of lower frequency signals comprises executing a graphical data flow program to test each of the plurality of lower frequency signals, wherein the graphical data flow program implements pipelining and parallelism to provide improved testing of each of the plurality of lower frequency signals.

6. The method of claim 1,
   wherein the plurality of communication devices comprises at least four communication devices and the plurality of signals comprises a corresponding at least four signals.

7. The method of claim 1, wherein the plurality of signals are of four different frequency bands.

8. A non-transitory computer accessible memory medium comprising program instructions for testing a plurality of communication devices, wherein the program instructions are executable by a processor to implement:
   receiving a plurality of signals from the plurality of communication devices, the plurality of signals comprising a respective signal from each of the plurality of communication devices, wherein each signal of a first subset of the plurality of signals has a different frequency than each signal of a second subset of the plurality of signals, wherein the plurality of signals are received concurrently;
   combining the received signals into a combined signal;
   downconverting the combined signal, wherein said downconverting comprises mixing the combined signal with an output from at least one local oscillator, wherein said downconverting generates a plurality of lower frequency signals, each of the plurality of lower frequency signals corresponding to a respective one of the plurality of received signals; and
   performing testing on each of the plurality of lower frequency signals, wherein said testing on each of the plurality of lower frequency signals is performed concurrently.

9. The non-transitory computer accessible memory medium of claim 8, wherein the at least one local oscillator comprises two local oscillators.

10. The non-transitory computer accessible memory medium of claim 8, wherein the lower frequency signals comprise baseband signals.

11. The non-transitory computer accessible memory medium of claim 8, wherein the program instructions are further executable to implement:
   repeating said receiving, said combining, said downconverting and said performing testing a plurality of times for different frequency bands;
   wherein the at least one local oscillator is not re-tuned for any of the plurality of signals.

12. The non-transitory computer accessible memory medium of claim 8,
   wherein said performing testing on each of the plurality of lower frequency signals comprises executing a graphical data flow program to test each of the plurality of baseband signals, wherein the graphical data flow program implements pipelining and parallelism to provide improved testing of each of the plurality of lower frequency signals.

13. The non-transitory computer accessible memory medium of claim 8,
   wherein the plurality of communication devices comprises at least four communication devices and the plurality of signals comprises a corresponding at least four signals.

14. The non-transitory computer accessible memory medium of claim 8, wherein the plurality of signals are of four different frequency bands.

15. A system, comprising:
   a processor; and
   a non-transitory memory medium coupled to the processor, wherein the memory medium comprises program instructions for testing a plurality of communication devices, wherein the program instructions are executable by the processor to implement:
      receiving a plurality of signals from the plurality of communication devices, the plurality of signals comprising a respective signal from each of the plurality of communication devices, wherein each signal of a first subset of the plurality of signals has a different frequency than each signal of a second subset of the plurality of signals, wherein the plurality of signals are received concurrently;
      combining the received signals into a combined signal;
      downconverting the combined signal, wherein said downconverting comprises mixing the combined signal with an output from at least one local oscillator, wherein said downconverting generates a plurality of lower frequency signals, each of the plurality of lower frequency signals corresponding to a respective one of the plurality of received signals; and
      performing testing on each of the plurality of lower frequency signals, wherein said testing on each of the plurality of lower frequency signals is performed concurrently.

16. The system of claim 15, wherein the at least one local oscillator comprises two local oscillators.

17. The system of claim 15, wherein the program instructions are further executable to implement:
   repeating said receiving, said combining, said downconverting and said performing testing a plurality of times for different frequency bands;
   wherein the at least one local oscillator is not re-tuned for any of the plurality of signals.

18. The system of claim 15,
   wherein said performing testing on each of the plurality of lower frequency signals comprises executing a graphical data flow program to test each of the plurality of baseband signals, wherein the graphical data flow program implements pipelining and parallelism to provide improved testing of each of the plurality of lower frequency signals.

19. The system of claim 15,
   wherein the plurality of communication devices comprises at least four communication devices and the plurality of signals comprises a corresponding at least four signals.

20. The system of claim 15, wherein the plurality of signals are of four different frequency bands.

\* \* \* \* \*